United States Patent [19]

Lindner et al.

[11] 4,192,940
[45] Mar. 11, 1980

[54] POLYESTERS WHICH CAN BE PREPARED BY REACTING A CARBONIC ACID ARYL ESTER WITH A POLYESTER PREPARED FROM A POLYHYDRIC ALCOHOL AND A POLYBASIC CARBOXYLIC ACID WHICH IS ALIPHATIC

[75] Inventors: Christian Lindner, Cologne; Carlhans Süling; Herbert Bartl, both of Odenthal; Dietrich Hardt, Leverkusen, all of Fed. Rep. of Germany

[73] Assignee: Bayer Aktiengesellschaft, Leverkusen, Fed. Rep. of Germany

[21] Appl. No.: 924,708

[22] Filed: Jul. 14, 1978

[30] Foreign Application Priority Data

Jul. 20, 1977 [DE] Fed. Rep. of Germany ....... 2732718

[51] Int. Cl.$^2$ ............................................. C08L 67/02
[52] U.S. Cl. .................................................. 528/370
[58] Field of Search .................................... 528/370

[56] References Cited

U.S. PATENT DOCUMENTS 3,444,141  5/1969  Shima .................................. 528/370
3,553,167  1/1971  Schnell et al. ...................... 528/370

*Primary Examiner*—Maurice J. Welsh
*Attorney, Agent, or Firm*—Connolly and Hutz

[57] ABSTRACT

Polyesters containing carbonate groups and consisting of repeating structural units corresponding to the general formula

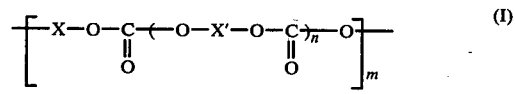

in which
X is the residue of a reaction product of a polyhydric alcohol with a polybasic aliphatic carboxylic acid having a molecular weight of from 800 to 3500,
X' has the same meaning as X or represents the residue of an aliphatic polyether having a molecular weight of from 800 to 3500,
n=0 or 1 to 10 and
m=is a number >20,
the intrinsic viscosity in tetrahydrofuran being from 0.8 to 2.5 dl/g.

7 Claims, No Drawings

POLYESTERS WHICH CAN BE PREPARED BY REACTING A CARBONIC ACID ARYL ESTER WITH A POLYESTER PREPARED FROM A POLYHYDRIC ALCOHOL AND A POLYBASIC CARBOXYLIC ACID WHICH IS ALIPHATIC

This invention relates to aliphatic polyesters containing carbonate groups and to a process for their production. Aliphatic polyesters can be obtained by condensing diols with dicarboxylic acids or dicarboxylic acid derivatives or by polycondensing hydroxy carboxylic acids or lactones. The polyesters generally have relatively low molecular weights of up to a few thousand and may be used as a diol component for the production of polyurethanes. It has been found that aliphatic polyesters containing carbonate groups and having molecular weights above 20,000 can be obtained by polycondensing polyester diols, preferably having molecular weights $\overline{M}n$ in the range of 800, more particularly 1400 to about 3500, with bifunctional carbonic acid derivatives in equimolar quantities in vacuo (below 35 Torr, preferably at 25 to 1 Torr) at temperatures of from 100° C. to 300° C., preferably from 130° C. to 200° C., in the presence of catalysts and distilling off the condensation products formed. Throughout this specification molecular weights are always the number average ($\overline{M}n$) of the molecular weight.

Accordingly, the present invention provides polyesters containing carbonate groups and consisting of repeating structural units corresponding to the general formula (I):

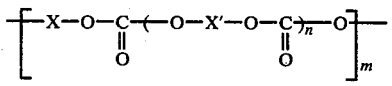

in which

X and X' independently represent the reaction product of a polyhydric alcohol with a polybasic aliphatic carboxylic acid having a molecular weight in the range from 800 to 3500, and X' may also represent the residue of an aliphatic polyether having a molecular weight of from 800 to 3500, $\underline{n}=0$ or 1 to 10 and $\underline{m}$ is a number $>20$, preferably from 22 to 100, having an intrinsic viscosity in tetrahydrofuran (Staudinger Index) $[\eta]$ in the range from 0.8 to 2.5 (dl/g).

Reaction products of polyhydric alcohols with polybasic, aliphatic carboxylic acids are preferably those of dihydric and, optionally, also trihydric alcohols with preferably dibasic aliphatic carboxylic acids. Instead of reacting the free carboxylic acids, it is also possible to react their anhydrides or esters with lower alcohols or mixtures thereof. The polybasic carboxylic acids are preferably acyclic. Examples are carbonic acid, oxalic acid, malonic acid, succinic acid, adipic acid, suberic acid, azelaic acid, sebacic acid, hexahydrophthalic acid anhydride and glutaric acid anhydride.

Examples of suitable polyhydric alcohols, which may optionally be used in admixture with one another, are ethylene glycol, 1,2- and 1,3-propylene glycol, 1,4- and 2,3-butylene glycol, 1,6-hexane diol, 1,8-octane diol, neopentyl glycol, cyclohexane dimethanol, 1,4-bis-(hydroxymethylcyclohexane), 2-methyl-1,3-propane diol, diethylene glycol, triethylene glycol, tetraethylene glycol, dipropylene glycol and dibutylene glycol.

The reaction products obtained from these carboxylic acids and alcohols are polyesters containing terminal hydroxyl groups. They have molecular weights of from 800 to 3500 and may be characterised by the formula HO—X—OH where X is as previously defined. As already mentioned, the polyesters containing carbonate groups according to the invention are formed from these polyesters containing terminal hydroxyl groups by reaction with bifunctional carbonic acid aryl esters.

Bifunctional carbonic acid aryl esters are, in particular, those corresponding to the general formula II:

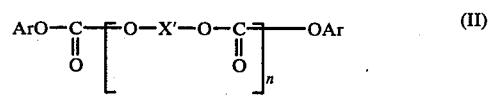

in which

Ar is a substituted or unsubstituted aryl radical containing from 6 to 18 carbon atoms, preferably 6 carbon atoms, $\underline{n}=0$ or 1 to 10 and X' is the bifunctional residue of a polyester or polyether, as previously defined.

These are known compounds.

Catalysts suitable for reacting the polyesters containing hydroxyl groups and the carbonic acid aryl esters are transesterification catalysts, for example, alkali metal or alkaline earth metal phenolates, alkali metal or alkaline earth metal alcoholates and tertiary amines, for example, triethylene diamine, morpholine, pyrrolidine, pyridine, triethylamine, or metal compounds such as antimony trioxide, zinc chloride, titanium tetrachloride and titanic acid tetrabutyl ester.

The catalyst is used in quantities of from 20 to 200 ppm, based on the total weight of the polycondensation reactants. The catalyst may be used in smaller quantities providing the starting materials contain no basic impurities where the acidic catalysts are used and no acidic impurities where the basic catalysts are used. It is preferred to use the catalyst in as small a quantity as possible in order to prevent colouration of the products.

The reaction is preferably carried out in the absence of a solvent. However, it is also possible to use solvents which are inert under the reaction conditions, such as hydrocarbons and, in particular, aromatic hydrocarbons.

The reaction time depends upon the reaction temperature, the quantity and type of catalyst used and the required molecular weight of the polyester containing carbonate groups. In general, reaction times of from 2 to 48 hours are sufficient, reaction times of from 4 to 24 hours being preferred.

The volatile condensation products formed may be removed during the reaction by distillation where the process is carried out in batches and by fractional distillation where the process is carried out continuously. Where sodium phenolate is used as the catalyst, it is preferred to polycondense a mixture of polyester diol and bifunctional carbonic acid aryl ester, preferably diphenyl carbonate, or a mixture of diphenyl carbonate and compounds corresponding to formula (II) at a temperature of from 110° C. to 170° C. and then to increase the viscosity of the polycondensation mixture by adding a bifunctional carbonic acid aryl ester of formula (II), preferably with n≧1, at a temperature of 170° C. or higher, accompanied by the removal of volatile condensation products by distillation. It has been found to be favourable to carry out the polycondensation reaction in so-called high-viscosity reactors, such as kneaders or extruders.

The polycondensation reaction may be terminated in known manner, for example by lowering the reaction temperature, by destroying or removing the catalyst or by adding so-called inhibitors. It has been found to be advantageous to use carbonic acid aryl esters as inhibitors in the case of terminal alcohol groups and alcohols as inhibitors in the case of terminal aryl carbonate groups. Where bifunctional compounds are used as inhibitors, it is possible, by adding them in carefully measured quantities, to terminate the polycondensation reaction whilst at the same time increasing the average molecular weight.

The polyesters according to the invention may be used as polymeric plasticisers or additives for other plastics, their favourable rubber-like properties, their resistance to ageing and their outstanding processibility in admixture with other plastics being particularly noticeable in this respect. Depending upon their molecular weight and chemical composition, they may also be used as adhesives, sealing materials or for coating textiles.

The intrinsic viscosity (Staudinger Index) $[\eta]$ was measured in tetrahydrofuran at 25° C. and is expressed in (dl/g). For the definition of intrinsic viscosity, see H. G. Elias "Makromolekule", Huthig and WepfVerlag, Basel, page 265.

EXAMPLE 1

2000 parts by weight of a polyester diol of adipic acid and a mixture of n-hexane-1,6-diol/neopentyl glycol in a ratio of 65:35 having an average molecular weight $\overline{M}n$ of 2000 (as determined by measuring the OH-number), 214 parts by weight of diphenyl carbonate and 0.12 part by weight of sodium phenolate were stirred for 2 hours at 130° C. and for 1 hour at 150° C. under a vacuum of 1.5 Torr. Volatile poly-condensation products mainly consisting of phenol were distilled off. As the distillation continued, the temperature was increased to 180° C. for 4 hours, during which time 20 parts by weight of a polytetrahydrofuran diol containing terminal phenyl carbonate groups and extended through —OCOO-bridges ($\overline{M}n$ of the polytetrahydrofuran 2000, degree of extension=2) were added, after which the reaction temperature was increased to around 185° C. to 190° C. for 5 hours with slow stirring or kneading. The product, a colourless rubber-like mass, had a Staudinger Index $[\eta]$, as measured in THF, of 1.5.

EXAMPLE 2

1800 parts by weight of a polyester diol of adipic acid and n-hexane-1,6-diol having an average molecular weight $\overline{M}n$ of 1800 (as determined by measuring the OH-number), 214 parts by weight of diphenyl carbonate and 0.11 part by weight of sodium phenolate were stirred for 2 hours at 130° C. and for 1 hour at 150° C. under a vacuum of 0.5 Torr. Volatile polycondensation products mainly consisting of phenol were distilled off. As the distillation continued, the temperature was increased to 180° C. for 4 hours, during which time 35 parts by weight of a polyester diol containing terminal phenyl carbonate groups and extended through —OCOO-bridges ($\overline{M}n$ of the polyester diol 2150, consisting of adipic acid and n-hexane-1,6-diol, degree of extension=2) were added. Subsequently, the reaction temperature was increased to 190° C. for 4 hours with slow stirring or kneading, the reaction mixture was dissolved in 1 liter of toluene after cooling to 120° C., 20 parts by weight of the above-mentioned polyester diol were added with thorough stirring and the toluene was evaporated off in vacuo, the internal temperature of the reaction mixture being slowly increased to 220° C. The reaction mixture was then dried in vacuo for 2 hours at that temperature, all the volatile products being carefully evaporated off. The colourless rubber-like material thus formed had a Staudinger Index $[\eta]$, as measured in THF, of 1.35.

EXAMPLE 3

1000 parts by weight of a polyester diol of adipic acid and a mixture of n-hexane-1,6-diol/neopentyl glycol in a ratio of 65/35 having an average molecular weight $\overline{M}n$ of 2000 (as determined by measuring the OH-number), 107 parts by weight of diphenyl carbonate and 0.12 part by weight of sodium phenolate were stirred for 2 hours at 130° C. and for 30 minutes at 150° C. under a vacuum of 1.5 Torr. Volatile condensation products mainly consisting of phenol were distilled off. After the mixture had cooled to 130° C., a mixture of 900 parts by weight of a polyester diol of adipic acid and n-hexane-1,6-diol having an average molecular weight $\overline{M}n$ of 1800 (as determined by measuring the OH-number) and 107 parts by weight of diphenyl carbonate was added, followed by stirring for 2 hours at 130° C. and for 2 hours at 160° C. with continued removal of volatile products by distillation. The temperature was then increased to 180° C. for 4 hours, during which time 22 parts by weight of a polytetrahydrofuran diol containing terminal phenyl carbonate groups and extended through —OCOO-bridges ($\overline{M}n$ of the polytetrahydrofuran diol 2000, degree of extension=2) were added. The reaction temperature was then increased to 185° C. for 2 hours and to 200° C. for 4 hours with slow stirring or kneading.

The product, a colourless rubber-like mass, had a Staudinger Index $[\eta]$, as measured in THF, of 1.3.

EXAMPLE 4

2000 parts by weight of a polyester diol of adipic acid and a mixture of n-hexane-1,6-diol/neopentyl glycol in a ratio of 65:35 having an average molecular weight $\overline{M}n$ of 2000 (as determined by measuring the OH-number), 214 parts by weight of diphenyl carbonate and 0.12 part by weight of sodium phenolate were stirred for 2 hours at 130° C. and for 1 hour at 150° C. under a vacuum of 1.5 Torr. Volatile polycondensation products mainly consisting of phenol were distilled off. As the distillation continued, the temperature was increased to 180° C. for 6 hours and to 195° C. for 2 hours. The product thus obtained, a colourless rubber-like soft mass, had a Staudinger Index $[\eta]$, as measured in THF, of 0.8.

We claim:

1. A polyester containing carbonate groups and consisting of repeating structural units corresponding to the general formula (I):

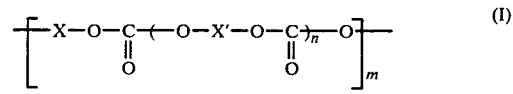

in which
- X is the residue of a hydroxy terminated reaction product of at least one polyhydric alcohol with a polybasic, aliphatic carboxylic acid having a molecular weight of from 800 to 3500 or with an anhydride or ester of the acid, or a mixture thereof
- X' has the same meaning as X or X' is the residue of an hydroxy terminated aliphatic polyether having a molecular weight of from 800 to 3500,
- $\underline{n} = 0$ or 1 to 10 and
- $\underline{m}$ is a number $>20$, having an intrinsic viscosity in tetrahydrofuran of from 0.8 to 2.5 (dl/g).

2. A polyester as claimed in claim 1, wherein the polybasic, aliphatic carboxylic acid is acyclic.

3. A process for preparing a polyester containing carbonate groups as claimed in claim 1 which comprises reacting a compound having a molecular weight of from 800 to 3500 of the formula HO—X—OH where X is as defined in claim 1 with a carbonic acid diaryl ester.

4. A process as claimed in claim 3, wherein the carbonic acid diaryl ester has the general formula II

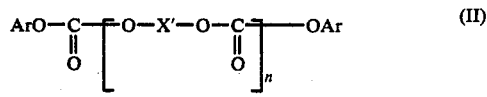

wherein
- Ar is a substituted or unsubstituted aryl radical containing 6 to 18 carbon atoms,
- n=0 or 1 to 10, and
- X' is the residue of a polyester or polyether.

5. A process as claimed in claim 3 or 4, wherein the reaction is carried out in the presence of a transesterification catalyst.

6. A process as claimed in claim 5, wherein the catalyst is used in a quantity of from 20 to 200 ppm based on the total weight of the polycondensation reactants.

7. A process as claimed in claim 3, wherein the reaction is carried out in the absence of a solvent.

* * * * *